UNITED STATES PATENT OFFICE.

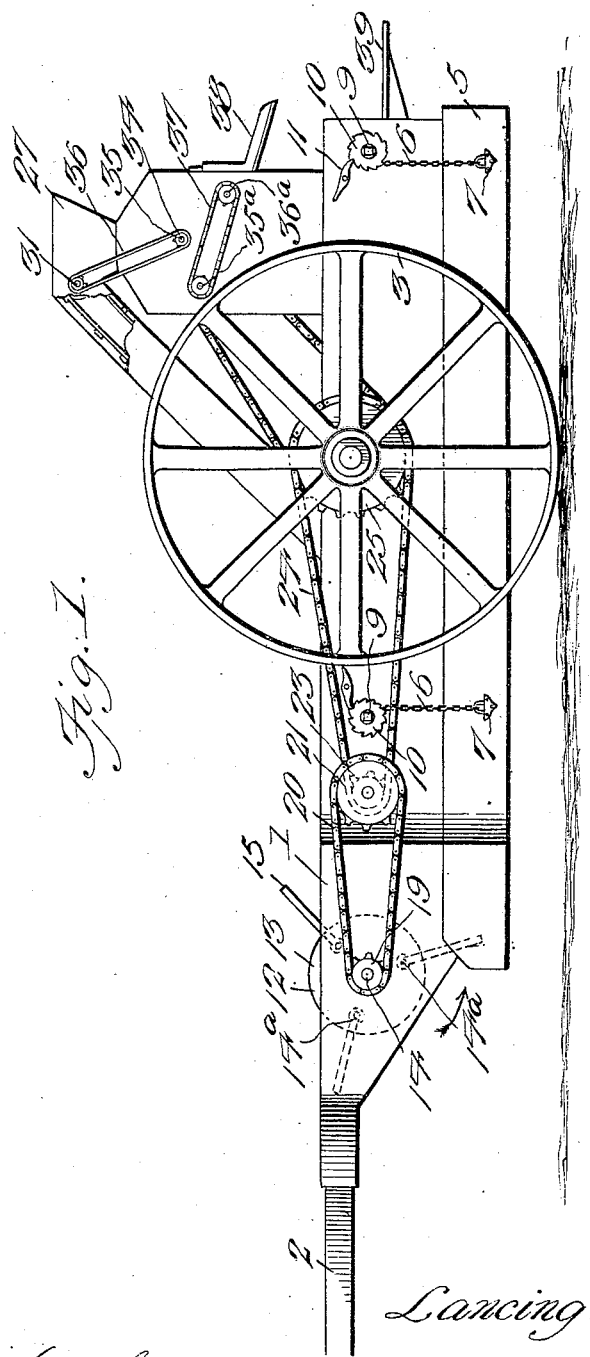

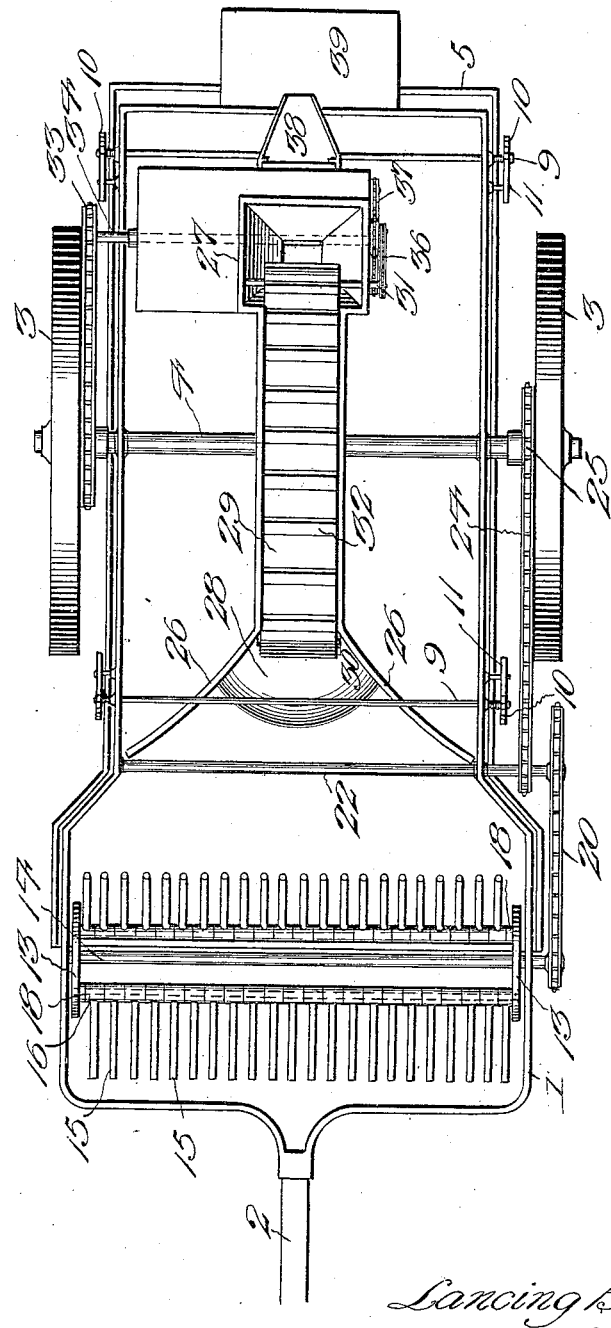

LANCING B. BAXTER, OF HICKORY, VIRGINIA.

PEA-HARVESTING MACHINE.

No. 872,887.　　　Specification of Letters Patent.　　　Patented Dec. 3, 1907.

Application filed November 24, 1906. Serial No. 344,906.

*To all whom it may concern:*

Be it known that I, LANCING B. BAXTER, a citizen of the United States of America, residing at Hickory, in the county of Norfolk and State of Virginia, have invented new and useful Improvements in Pea-Harvesting Machines, of which the following is a specification.

This invention relates to pea harvesting machines, and the principal object of the same is to provide novel means for stripping the peas from the vines, comprising a gathering reel consisting of tubular members having fingers extending therefrom. This and other objects may be attained by means of the construction illustrated in the accompanying drawing, in which:

Figure 1 is a side elevation of a pea-harvesting machine made in accordance with my invention. Fig. 2 is a plan view of the machine.

Referring to the drawings for a more particular description of my invention, the numeral 1 designates a frame comprising a substantially rectangular box, the front end of which converges and provides means for the attachment of a draft tongue 2. Ground wheels 3 are journaled in the frame 1 upon an axle 4. A platform 5 is adjustable vertically with relation to the frame 1 by means of chains 6 connected to staples 7 at the sides of the platform, said chains passing upward and around shafts 9 having squared outer ends for suitable cranks for turning said shafts. A ratchet wheel 10 is mounted upon each of the shafts 9 and pawls 11 are pivoted to the frame 1 to engage said ratchet wheels. By means of this construction the platform is raised or lowered to operate upon vines of different height.

Journaled in the front part of the frame 1 is a reel 12, said reel comprising disks 13 through which a central shaft 14 passes, said disks being secured to the shaft. A series of rods 14ᵃ are secured at their opposite ends to the disks 13 and strung upon these rods are a series of gathering fingers 15, said gathering fingers each consisting of a sleeve portion 16 through which the rod 14ᵃ passes, and an extending finger 15 projecting from the sleeve portion. Any suitable number of rods 14ᵃ may be employed and the gathering fingers are strung upon the rods and held in frictional engagement therewith by means of washers 18 at the ends of said rod. It is to be noted that the fingers upon one of the rods are disposed in line with the spaces between the fingers of the next adjoining rod, as shown more particularly in Fig. 2. The result of this construction is that all parts of the pea vines are presented to the fingers as the machine is drawn over the row of vines.

To actuate the gathering wheel a sprocket wheel 19 is secured to one end of the shaft 14, and around the sprocket wheel a chain 20 passes, said chain extending around a sprocket wheel 21 on a shaft 22 journaled in the frame. On the shaft 22 is a sprocket wheel 23 connected by a chain 24 to a sprocket wheel 25 on the axle 4 of the ground wheel. In rear of the gathering reel located upon the platform 5 is a pair of diverging plates 26 which are extended upward at the sides of an endless apron to form a housing therefor, said plates terminating at their upper ends at the side of a hopper 27. A depression 28 is formed in the platform 5 and the peas are deposited in this depression by the gathering reel from whence they are delivered to the hopper 27 by means of the endless apron 29 mounted upon a roller 30 in the platform 5 and upon a similar roller 31 journaled in the hopper 27. The endless apron 29 is provided with a series of slats 32 for carrying the peas up and depositing them within the hopper. The elevator is actuated by means of a chain 33 passing over a sprocket wheel on the axle 4 and around a sprocket wheel on shaft 34 journaled in the hopper. On the shaft 34 is a sprocket wheel 35, and a belt 36 passes around said sprocket wheel and around a sprocket wheel on the shaft of the roller 31. A shaft 35ᵃ is journaled in the hopper 27 and provided with a sprocket wheel at the side of said hopper, and a shaft 36ᵃ also mounted in the hopper 27, carries a sprocket wheel, and a sprocket chain 37 connects these two sprocket wheels. These parts are designed to drive an ordinary hulling and discharge mechanism, (not shown). A discharge spout 38 is provided for discharging the peas into a receptacle placed upon a table or platform 39.

From the foregoing it will be obvious that the fingers 15 may be spaced apart upon the rods 14 by suitable washers between the sleeve portions 16 of said fingers whenever the condition of the plants or vines should require such an adjustment. The fingers 15 are held upon the rods 14 with sufficient friction for stripping the peas from the vines. However, should the fingers strike a stone or other obstacle, the sleeve 16 will turn upon the shaft and prevent the breaking of the fingers.

The operation of my invention may be briefly described as follows: The machine is drawn by horses over the field of peas and the fingers 15 rotate in the direction indicated by the arrow in Fig. 1 to strip the peas from the vines and deposit them upon the platform 5 and in the depression 28 therein, the endless apron 29 then carrying the peas upward and depositing them in the hopper 27 where they are hulled by suitable means and discharged through the spout 38 into suitable receptacles.

Having thus described the invention, what I claim is:

1. In a pea harvester, a gathering reel comprising disks mounted upon a shaft, gathering fingers comprising tubular portions and fingers extending therefrom, rods secured to the disks and said fingers strung upon the rods, substantially as described.

2. In a pea harvester, a reel for gathering peas comprising disks mounted upon a shaft, rods connecting the disks, gathering fingers mounted upon the rods and spaced apart by sleeves formed integral with the fingers, the fingers of each alternate series being disposed in line with the spaces between the fingers of the next adjacent series, substantially as described.

In testimony whereof, I affix my signature in presence of two witnesses.

LANCING B. BAXTER.

Witnesses:
H. McGOWAN KING,
BRUCE B. BAXTER.